United States Patent
Smith

(10) Patent No.: US 10,307,695 B2
(45) Date of Patent: Jun. 4, 2019

(54) DEGASSING SYSTEM AND TOWER FOR SULFUR PROCESS

(71) Applicant: Strom W. Smith, Ocean Springs, MS (US)

(72) Inventor: Strom W. Smith, Ocean Springs, MS (US)

(*) Notice: Subject to any disclaimer, the term of this patent is extended or adjusted under 35 U.S.C. 154(b) by 0 days.

(21) Appl. No.: 16/101,798

(22) Filed: Aug. 13, 2018

(65) Prior Publication Data

US 2019/0060793 A1 Feb. 28, 2019

Related U.S. Application Data

(60) Provisional application No. 62/548,854, filed on Aug. 22, 2017, provisional application No. 62/700,727, filed on Jul. 19, 2018.

(51) Int. Cl.
| | | |
|---|---|---|
| *B01D 1/16* | (2006.01) | |
| *B01D 19/00* | (2006.01) | |
| *C01B 17/02* | (2006.01) | |

(52) U.S. Cl.
CPC .......... *B01D 19/0068* (2013.01); *B01D 1/16* (2013.01); *B01D 19/0005* (2013.01); *B01D 19/0073* (2013.01); *C01B 17/0232* (2013.01); *B01D 2253/112* (2013.01); *B01D 2257/304* (2013.01)

(58) Field of Classification Search
CPC .......... B01D 19/0005; B01D 19/0068; B01D 19/0073; B01D 2257/304; C01B 17/0232
See application file for complete search history.

(56) References Cited

U.S. PATENT DOCUMENTS

| | | | |
|---|---|---|---|
| 4,360,234 A | 11/1982 | Hsueh et al. | |
| 4,393,660 A | 7/1983 | Kleiner et al. | |
| 4,537,605 A * | 8/1985 | Gouw ................. | C01B 17/0232 423/576.2 |

(Continued)

OTHER PUBLICATIONS

Spintek "Porous Metal Design Guidebook" Mar. 1, 2003 (Mar. 1, 2003) p. 1 para[0001]; p. 2 para[0003], (0009); Retrieved from http://spintek.com/PDF/porous_metal_membrane_guide_spintek.pdf.

(Continued)

*Primary Examiner* — Jason M Greene
(74) *Attorney, Agent, or Firm* — Keeling Law, LLC; Kenneth A. Keeling; Mark S. Solomon

(57) ABSTRACT

Embodiments of a degassing system of the present invention generally include a degassing device having a sintered metal matrix component; and a process vessel having a liquid inlet and liquid outlet through which liquid flows providing a liquid level there within; wherein the degassing device, which is fluidly connected to a pressurized gas source, is disposed within the process vessel beneath the surface of the liquid, wherein pressurized gas is introduced to the degassing device and forced through the sintered metal matrix to create gas micro-bubbles which rise through the liquid to strip volatile compounds therefrom, the gaseous composition above the surface of the liquid being evacuated through the gas outlet. In one embodiment, a degassing tower having multiple degassing chambers and degassing devices is employed. In one embodiment, a metal powder is disposed within the sintered metal matrix. Embodiments of methods of using the degassing device are also provided.

14 Claims, 7 Drawing Sheets

(56) References Cited

U.S. PATENT DOCUMENTS

| | | | |
|---|---|---|---|
| 4,556,523 A | 12/1985 | Lecoffre et al. | |
| 4,612,020 A * | 9/1986 | Fischer | B01D 19/0005 |
| | | | 423/578.1 |
| 4,844,720 A * | 7/1989 | Pendergraft | B01D 19/0005 |
| | | | 95/235 |
| 5,080,695 A | 1/1992 | Kassarjian | |
| 5,340,383 A | 8/1994 | Womack | |
| 5,632,967 A | 5/1997 | Nasato | |
| 5,935,548 A * | 8/1999 | Franklin | C01B 17/0232 |
| | | | 423/567.1 |
| 6,010,677 A * | 1/2000 | Scheybeler | C01B 17/0232 |
| | | | 423/567.1 |
| 6,149,887 A | 11/2000 | Lagas et al. | |
| 6,676,918 B2 | 1/2004 | Wu et al. | |
| 8,021,539 B2 | 9/2011 | Hassan et al. | |
| 8,371,741 B2 | 2/2013 | Hassan et al. | |
| 9,346,677 B2 | 5/2016 | Metheral et al. | |
| 2009/0249955 A1* | 10/2009 | Bodner | B01D 19/0005 |
| | | | 95/250 |
| 2011/0020212 A1* | 1/2011 | Tonjes | C01B 17/0232 |
| | | | 423/576.2 |
| 2011/0182802 A1* | 7/2011 | Garg | C01B 17/0232 |
| | | | 423/578.1 |
| 2014/0065057 A1 | 3/2014 | Metheral et al. | |
| 2015/0129477 A1* | 5/2015 | Jones | C02F 1/24 |
| | | | 210/202 |
| 2015/0259205 A1* | 9/2015 | Borsboom | C01B 17/0232 |
| | | | 423/578.1 |
| 2016/0137499 A1* | 5/2016 | Groves | C01B 17/0232 |
| | | | 422/129 |
| 2017/0096337 A1* | 4/2017 | Fenderson | C01B 17/0232 |
| 2018/0020700 A1* | 1/2018 | Lucas | B01F 5/0465 |
| | | | 426/487 |

OTHER PUBLICATIONS

Wikipedia "Sparging (Chemistry)" Jun. 7, 2016 (Jun. 7, 2016) p. 1 para[0001]; Retrieved from https://en.wikipedia.org/w/index.php?title=Sparging_(chemistry)&oldid=724101112.

International Search Report, dated Oct. 25, 2018.

ISA Written Opinion, dated Oct. 25, 2018.

* cited by examiner

US 10,307,695 B2

DEGASSING SYSTEM AND TOWER FOR SULFUR PROCESS

CROSS-REFERENCE TO RELATED APPLICATIONS

This application claims the benefit of U.S. Provisional Application No. 62/548,854 filed on Aug. 22, 2017, and U.S. Provisional Application No. 62/700,727 filed on Jul. 19, 2018, which applications are incorporated herein by reference as if reproduced in full below.

STATEMENT REGARDING FEDERALLY SPONSORED RESEARCH OR DEVELOPMENT

Not Applicable.

BACKGROUND OF THE INVENTION

Field of the Invention

The present invention generally relates to sulfur processing. More particularly, embodiments of the present invention are directed to an apparatus and a method for removing hydrogen sulfide compounds from liquid sulfur.

Background of the Invention

Sulfur is used for manufacturing sulfuric acid, medicine, cosmetics, fertilizers, and rubber products. The majority of sulfur produced worldwide is byproduct sulfur from crude oil refineries and other hydrocarbon processing plants. Typically present in the sulfur produced in a sulfur manufacturing process are volatile hydrogen sulfide compounds. As such compounds are generally undesirable impurities, removal thereof from the (typically molten) sulfur is required.

Description of the Related Art

It is well known to remove hydrogen sulfide compounds from liquid sulfur by introducing air in the liquid sulfur by various methods. In one such method, a pipe or conduit having a plurality of spaced holes is immersed in the sulfur. Air pumped into the pipe is introduced into the sulfur through the spaced holes, producing air bubbles in the sulfur. Degasification of the sulfur occurs as the bubbles rise to the surface. One degasification method uses a tower with structured packing installed therein to provide intimate contact between the introduced air and the liquid sulfur. Some prior art apparatuses and methods for degasifying liquid sulfur are disclosed in U.S. Pat. No. 9,346,677 to Metheral et al., U.S. Pat. Nos. 8,371,741 and 8,021,539 to Hassan et al., U.S. Pat. No. 6,676,918 to Wu et al., U.S. Pat. No. 6,149,887 to Lagas, et al, U.S. Pat. No. 5,632,967 to Nasato, U.S. Pat. No. 5,340,383 to Womack, U.S. Pat. No. 5,080,695 to Kassarjian, and U.S. Pat. No. 4,556,523 to Lecoffre et al., which applications are incorporated herein by reference in their entirety as if reproduced in full below.

BRIEF SUMMARY OF THE INVENTION

Embodiments of a degassing device of the present invention generally include a sintered, stainless steel woven wire mesh matrix through which a gas, such as air, is flowed to create gas micro-bubbles which are employed to strip hydrogen sulfide compounds from molten sulfur. In one embodiment, a powder, such as a stainless steel powder, is disposed within the mesh. In one embodiment, a multi-stage degassing tower employs such gas micro-bubbles. Embodiments of methods of using embodiments of a degassing device of the present invention are also provided.

BRIEF DESCRIPTION OF THE DRAWINGS

For a more complete understanding of the present invention, reference is now made to the accompanying drawings, in which.

DETAILED DESCRIPTION OF EXEMPLARY EMBODIMENTS OF THE INVENTION

Figure 1:
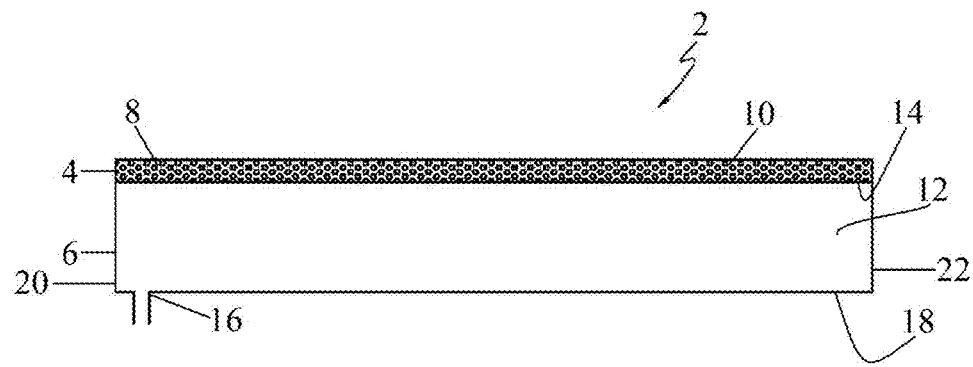
FIG. 1 is side view of an embodiment of a degassing device of the present invention.

The exemplary embodiments are best understood by referring to the drawings, like numerals being used for like and corresponding parts of the various drawings. In the following description of embodiments, orientation indicators such as "top," "bottom," "up," "down," "upper," "lower," "front," "back," etc. are used for illustration purposes only; the invention, however, is not so limited, and other possible orientations are contemplated.

Referring first to FIG. 1, an embodiment of a degassing component (device) 2 is depicted. In one embodiment, a degassing device 2 comprises an upper section 4 and a lower section 6. In one embodiment, upper section 4 comprises one or more layers of a sintered metal matrix 8. In one embodiment, a sintered metal matrix 8 comprises stainless steel. In one embodiment, a sintered metal matrix 8 comprises a wire mesh. In one embodiment, a sintered metal matrix 8 comprises a woven wire mesh. In one embodiment, at least a portion of sintered metal matrix 8 comprises a powder, such as, but not limited to, stainless steel powder 10, dispersed there within. In one embodiment, a sintered metal matrix 8 comprises a stainless steel woven wire mesh material impregnated with stainless steel powder 10, such as the medium commercially available from Pall Corporation of Port Washington, N.Y. as PMM Medium.

In one embodiment, lower section 6 of degassing device 2 comprises a substantially hollow structure adapted to accommodate a stripping gas (not shown) provided at an elevated pressure. In one embodiment, lower section 6 comprises a substantially cylindrical geometry, although other geometries may be employed. In one aspect, at least a portion of an interior 12 of lower section 6 is in fluid communication with upper section 4 along an interface 14 there between. In one embodiment, interface 14 may extend along substantially the entire length of degassing device 2, while in other embodiments a degassing device 2 may comprise a plurality of non-contiguous interfaces 14.

In one embodiment, stripping gas (not shown) is introducible to lower section 6 via one or more gas inlets 16. The stripping gas employed may be an oxygen-containing gas, such as, but not limited to, air, or a generally inert gas, such as, but not limited to, nitrogen, as would be understood by one skilled in the art. Although in the embodiment of FIG. 1 the gas inlet 16 is depicted as being connected to lower section 6 along a bottom edge 18 thereof, the invention is not so limited and gas inlets 16 may also (or only) be provided along lower section 6 side walls 20 and/or 22.

Figure 2:
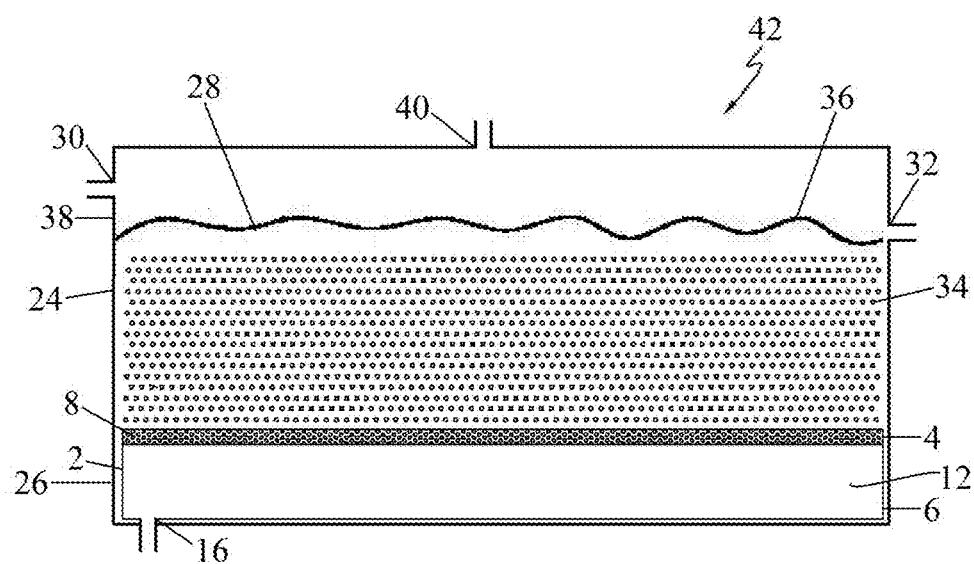
FIG. 2 is a side view of an embodiment of a process apparatus of the present invention.

FIG. 2 depicts a generalized embodiment of degassing system 42 comprising a degassing device 2 disposed within a process vessel 24. In the embodiment shown in FIG. 2, a degassing device 2 is positioned proximate a lower portion 26 of process vessel 24, although the invention is not so limited and a degassing device 2 may be otherwise positioned within a process vessel 24. In one embodiment (see, for example, FIG. 9) a plurality of degassing devices 2 are provided within a process vessel 24. As shown in the embodiment of FIG. 2, a gas inlet 16 is provided whereby a pressurized stripping gas (not shown) may be provided to the interior 12 of lower section 6 of the degassing device 2. In the embodiment of FIG. 2, a process liquid 28, such as, but not limited to, molten sulfur, is provided within process vessel 24 above upper section 4 of the degassing device 2. In the embodiment of FIG. 2, process liquid 28 is introduced to process vessel 24 via a process liquid inlet 30, and process liquid 28 is evacuated from process vessel 24 via a process liquid outlet 32. In various other embodiments (not depicted in FIG. 2), other numbers, orientations, and/or locations of process liquid inlets 30 and/or process liquid outlets 32 may be employed, as would be understood by one skilled in the art.

In FIG. 2, the presence of pressurized stripping gas (not shown) within lower section 6 interior 12 results in flow of the stripping gas upward through sintered metal matrix 8, whereby stripping gas micro-bubbles (bubbles) 34 produced there within diffuse upward through process liquid 28 within process vessel 24. In one aspect, stripping gas bubbles 34 which rise above an upper surface 36 of process liquid 28 combine to form a gaseous composition (not shown) within an upper portion 38 of process vessel 24. In one embodiment, process vessel 24 comprises one or more gas outlets 40 via which the gaseous composition (not shown) may exit process vessel 24.

In one aspect, dispersion of stripping gas bubbles 34 into process liquid 28 effectuates displacement (degassing) of volatile substances, i.e., impurities, (such as, but not limited to, hydrogen sulfide and hydrogen polysulfide compounds) from process liquid 28 into the gaseous composition (not shown) created within upper portion 38 of process vessel 24, as is generally known within the art. In one embodiment, the gas bubbles 34 have a median diameter of about 10 microns.

In one embodiment, the gas bubbles 34 have a median diameter of about 1-2 microns. Not to be bound by theory, it is believed that smaller bubble size facilitates degassing of a molten sulfur process liquid 28.

Figure 3:
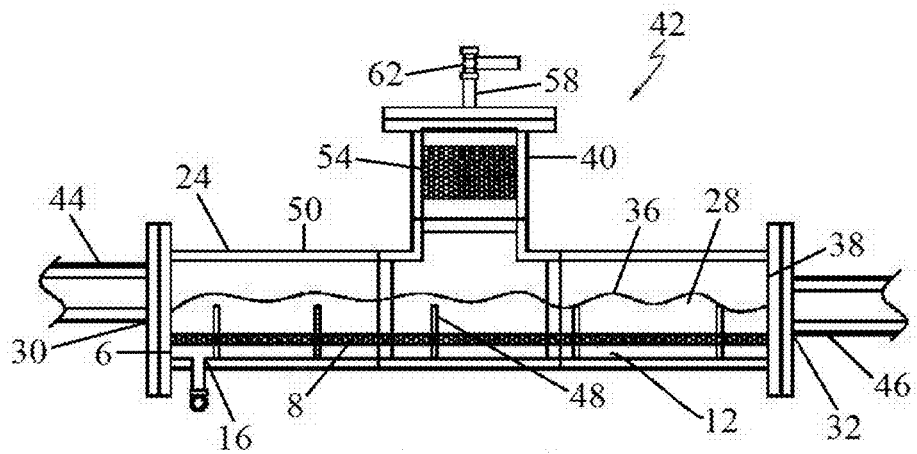
FIG. 3 is a side sectional view of an embodiment of a process apparatus of the present invention.
Figure 3A:
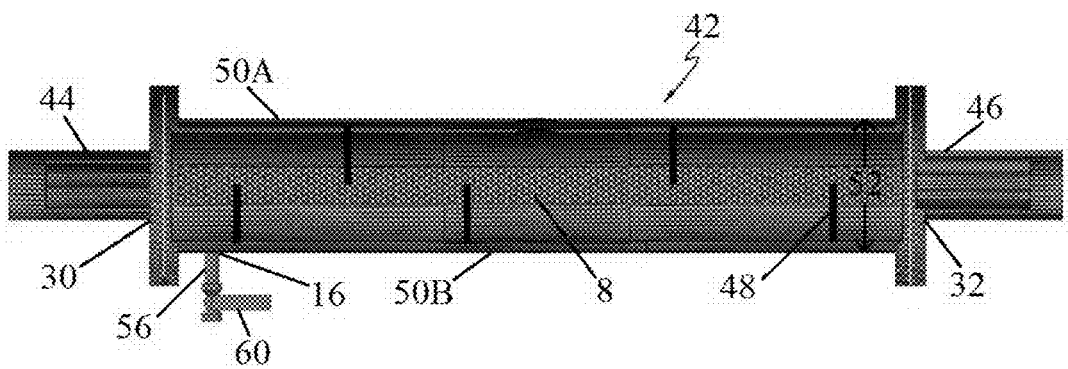
FIG. 3A is a top sectional view of the embodiment of a process apparatus of the present invention depicted in FIG. 3.
Figure 3B:
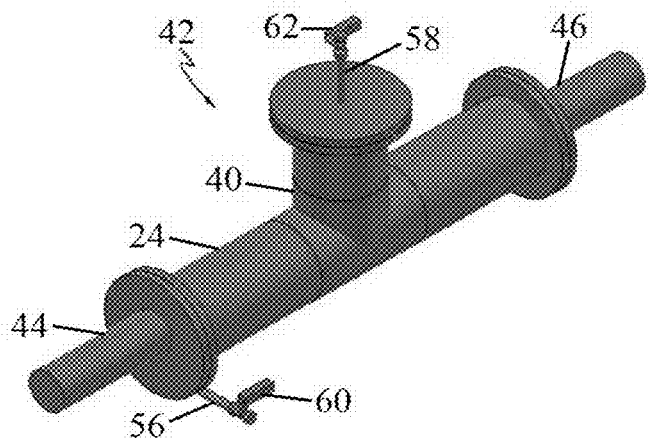
FIG. 3B is an isometric view of the embodiment of a process apparatus of the present invention depicted in FIG. 3.

FIGS. 3, 3A, and 3B depict an embodiment of a degassing system 42 comprising a degassing device 2. FIG. 3 depicts a front sectional view of degassing system 42, wherein a process vessel 24 is fluidly connected via a process liquid inlet 30 to an inlet process piping section 44, and fluidly connected via a process liquid outlet 32 to an outlet process piping section 46. In one embodiment, process liquid 28 flows from inlet process piping section 44 through process vessel 24 to outlet process piping section 46. As depicted in FIG. 3, a gas inlet 16 is provided to allow for introduction of stripping gas (not shown) into degassing device 2 lower section 6 interior 12. As shown in the embodiment of FIG. 3, process vessel 24 may comprise one or more fluid flow directors, such as, but not limited to, baffles, 48. In one aspect, baffles 48 affect the flow of stripping gas (not shown) within lower section 6 interior 12. In another aspect, baffles 48 affect the flow of process liquid within process vessel 24.

In one embodiment, baffles 48 effectuate turbulent flow of process liquid 28 within process vessel 24. As shown in FIG. 3A, in one embodiment baffles 48 originate proximate a longitudinal side wall 50 and extend only partially across a width 52 of degassing system 42. In the embodiment depicted in FIG. 3A, baffles 48 alternatingly originate from opposite sides 50A, 50B of degassing system 42.

In the embodiment of FIG. 3, stripping gas (not shown) supplied via gas inlet 16 to interior 12 is forced through sintered metal matrix 8 to form bubbles (not shown in FIG. 3) which flow upward through process liquid 28 into upper portion 38 of process vessel 24. Gaseous material (not shown) within upper portion 38 is allowed to flow out of process vessel 24 via gas outlet 40. In the embodiment shown in FIG. 3, degassing system 42 comprises an entrainment prevention device, such as, but not limited to, a demister 54, proximate or within, but in fluid communication with, gas outlet 40. In one aspect, a demister 54 comprises a pad, mesh, or packing designed to prevent liquid droplets or solid particles entrained in the gaseous material (not shown) from exiting process vessel 24 via gas outlet 40.

An external view of an embodiment of a degassing system 42 is shown in FIG. 3B. Therein is depicted a substantially cylindrical process vessel 24 intermediate inlet process piping section 44 and outlet process piping section 46, although the invention is not so limited and other vessel shapes and piping arrangements may be employed. Also shown in FIG. 3B is gas inlet piping 56 which is in fluid communication with gas inlet 16 (not visible in FIG. 3B) and gas outlet piping 58 which is in fluid communication with gas outlet 40. As shown in FIG. 3B, gas inlet piping 56 and/or gas outlet piping 58 may comprise flow control valves 60 and 62, respectively. In the embodiment shown in FIG. 3B, connection of inlet process piping section 44, outlet process piping section 46, and gas outlet piping 58 to process vessel 24 comprise flanged connections (not separately labeled), however, connection of any of these components, directly or indirectly, to process vessel 24 may comprise other fluidly communicative connection means, as would be understood by one skilled in the art. In other embodiments (not shown), any of these components may be provided integral to process vessel 24.

Figure 4:
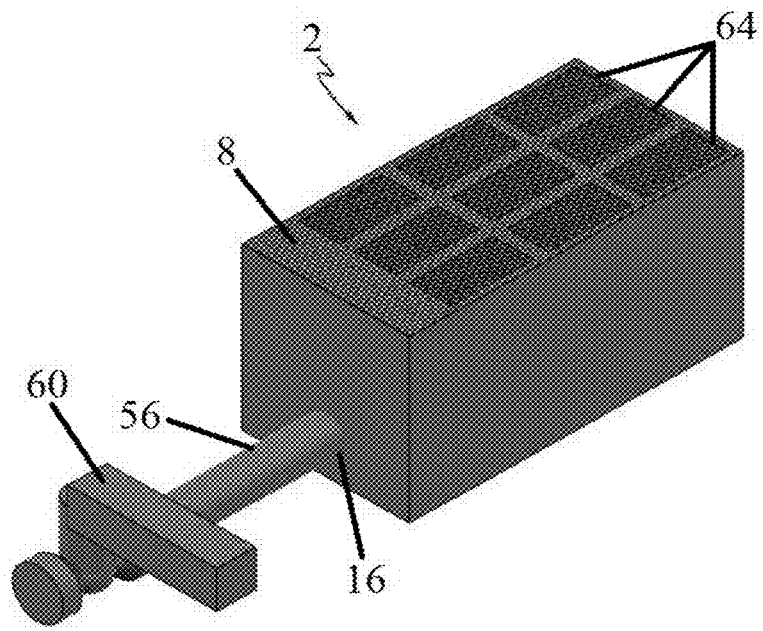
FIG. 4 is an isometric view of an embodiment of a degassing device of the present invention.
Figure 5:
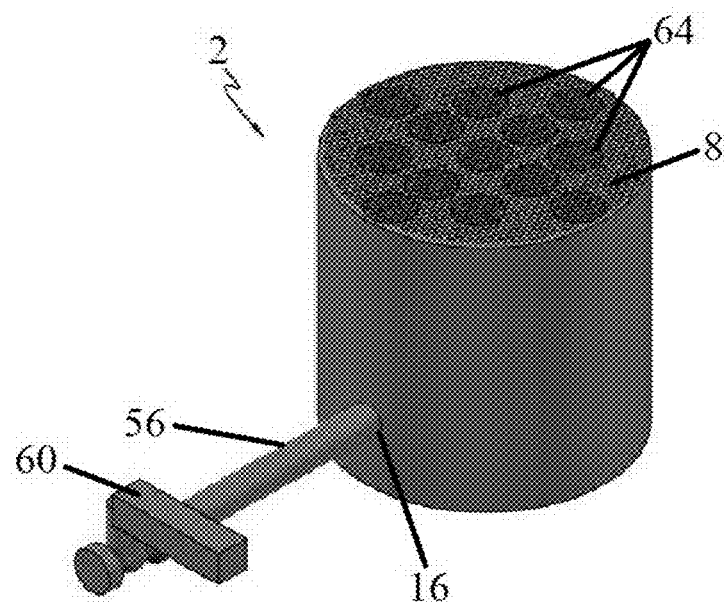
FIG. 5 is an isometric view of an embodiment of a degassing device of the present invention.

Various embodiments, configurations, and arrangements of degassing devices 2, and/or components thereof, are depicted in FIGS. 4, 5, 6, 6A, 7, and 8. FIGS. 4 and 5 show embodiments of degassing devices 2 comprising a plurality of discrete air chambers 64 disposed there within. Although degassing device 2 is depicted as rectangular (FIG. 4) or round (FIG. 5), the invention is not so limited and a degassing device 2 may be of any geometric shape. In the embodiments of FIG. 4 and FIG. 5, air chambers 64 may extend downward though at least a portion of the degassing device 2. In one embodiment, air chambers 64 extend downward and are in fluid communication with a common lower section 6 (not visible in FIGS. 4 and 5) as depicted in FIG. 3. Air chambers 64 may be of any geometric shape and may be symmetrically or non-symmetrically arranged. In the embodiments of FIGS. 4 and 5, at least one air chamber 64 comprises an upper section 4 (not visible) comprising a sintered metal matrix 8. In one aspect, air chambers 64 allow for fluid communication of gas from lower section 6 to upper section 4 and through sintered metal matrix 8.

Figure 6:
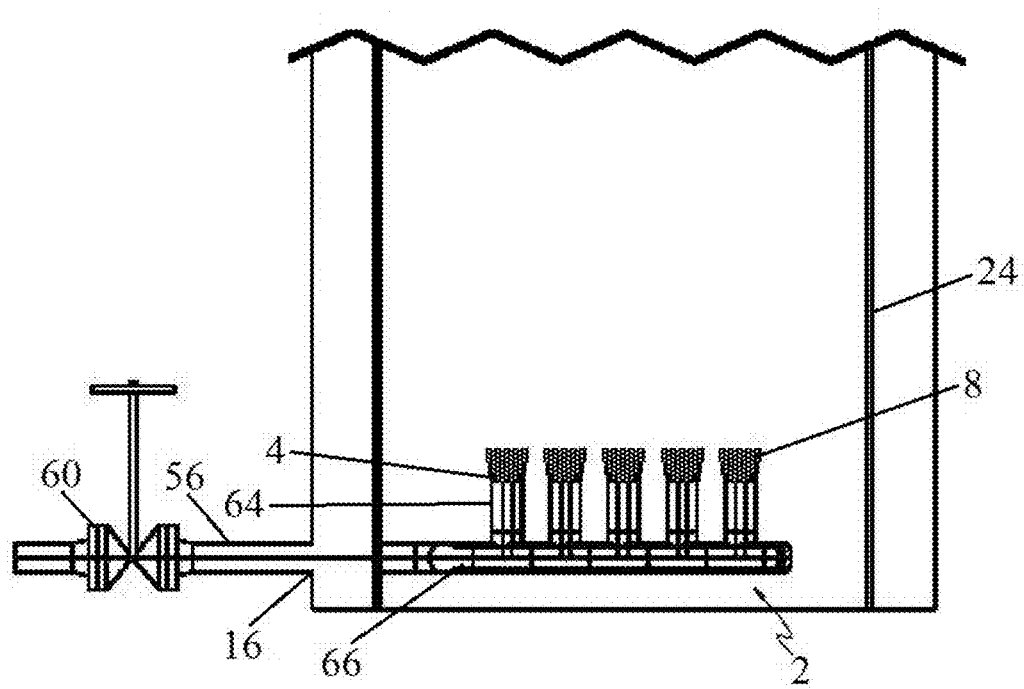
FIG. 6 is a side sectional view of a portion of an embodiment of a process apparatus of the present invention.
Figure 6A:
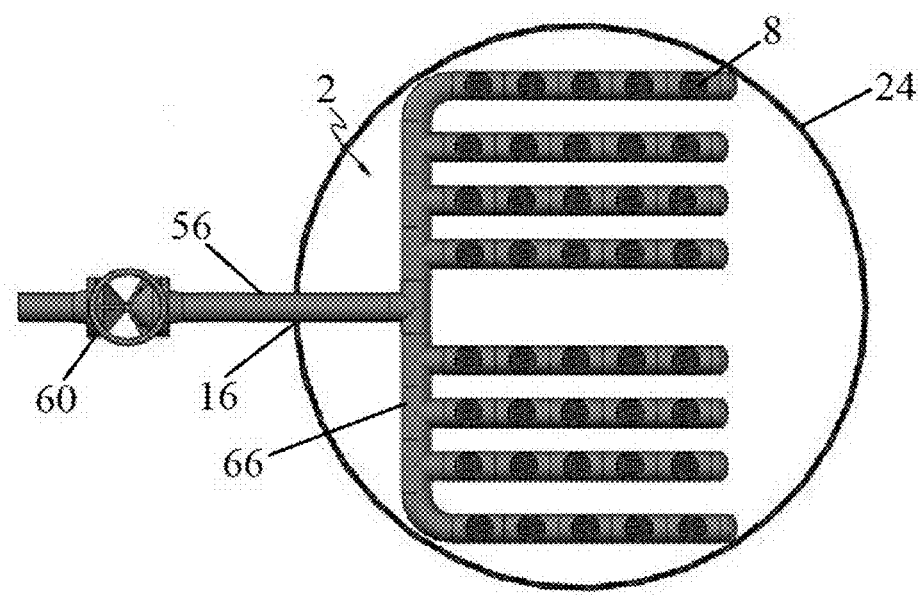
FIG. 6A is a top sectional view of the embodiment of a process apparatus of the present invention depicted in FIG. 6.

Referring now to FIGS. 6 and 6A, an embodiment of a manifold-based degassing device 2 is depicted. In the embodiment of FIG. 6, a degassing device 2 comprises a plurality of separated air chambers 64, each fluidly connected to a gas manifold 66. At least one air chamber 64 comprises an upper section 4 comprising a sintered metal matrix 8. In one aspect, air chambers 64 allow for fluid communication of gas (not shown) from manifold 66 to upper section 4 and through sintered metal matrix 8. FIG. 6A, which is a top view of the degassing device 2 of FIG. 6, shows the arrangement of air chambers 64 along manifold 66. Although FIG. 6 depicts a branched manifold 66, other configurations are employable, as would be understood by one skilled in the art.

Figure 7:
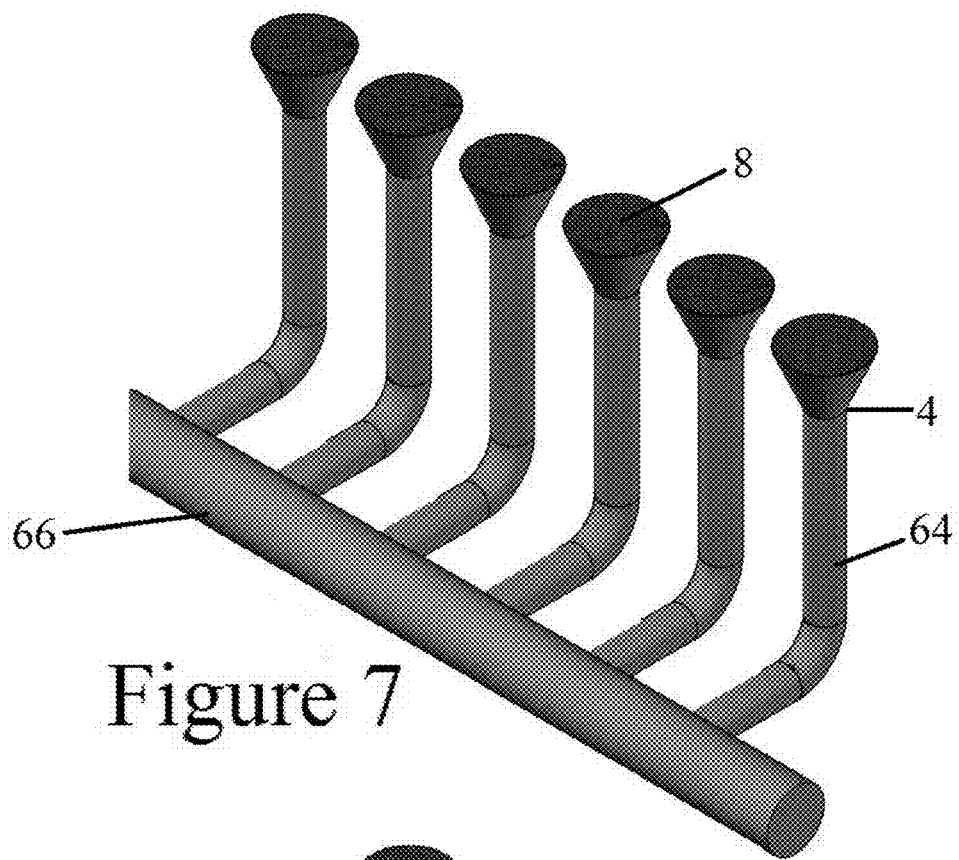
FIG. 7 is an isometric view of an embodiment of a manifold degassing device of the present invention.
Figure 8:
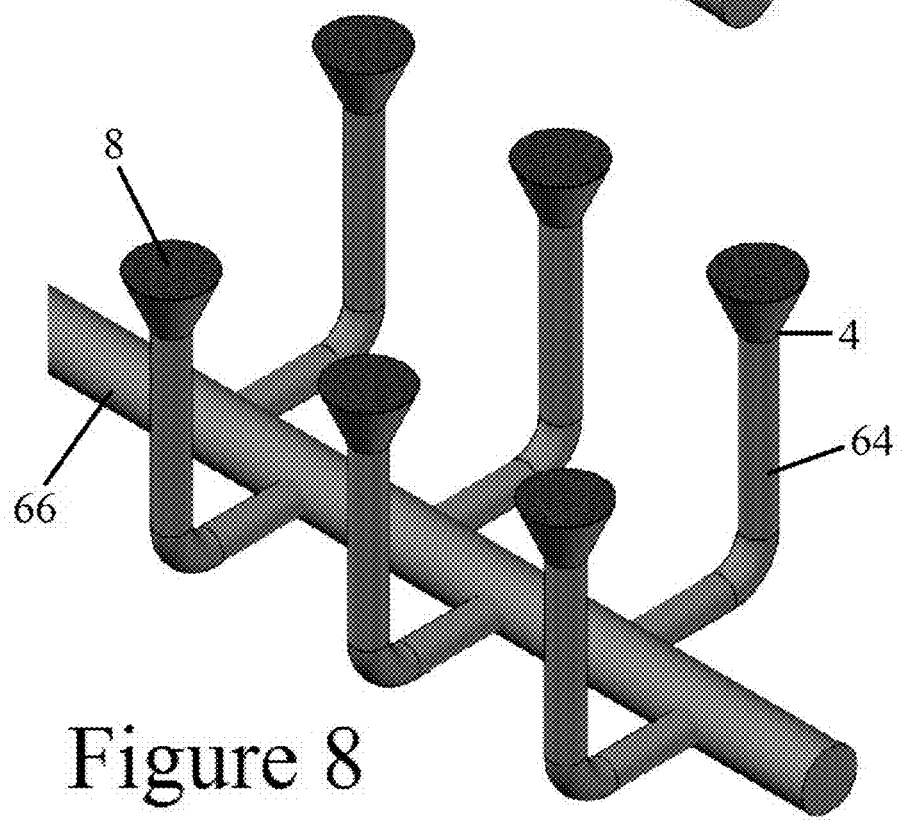
FIG. 8 is an isometric view of an embodiment of a manifold degassing device of the present invention.

While FIG. 6 depicts an embodiment wherein air chambers 64 extend substantially linearly from a manifold 66, other configurations are contemplated. FIGS. 7 and 8 depict embodiments of a manifold 66 wherein air chambers 64 comprise an 1-shaped geometry. In addition, other non-linearly-shaped air chambers 64 may be employed.

While the degassing devices 2 have been described as being vertically oriented, i.e., configured and positioned such that gas bubbles are directed substantially straight upward toward the surface of a liquid to be degassed, the invention is not so limited and other orientations may be employed. Such orientations include, but are not limited to, upwardly angled, horizontal, and downwardly angled. In addition, in embodiments comprising a plurality of air chambers 64, one or more air chambers 64 may be similarly or differently oriented.

Figure 9:
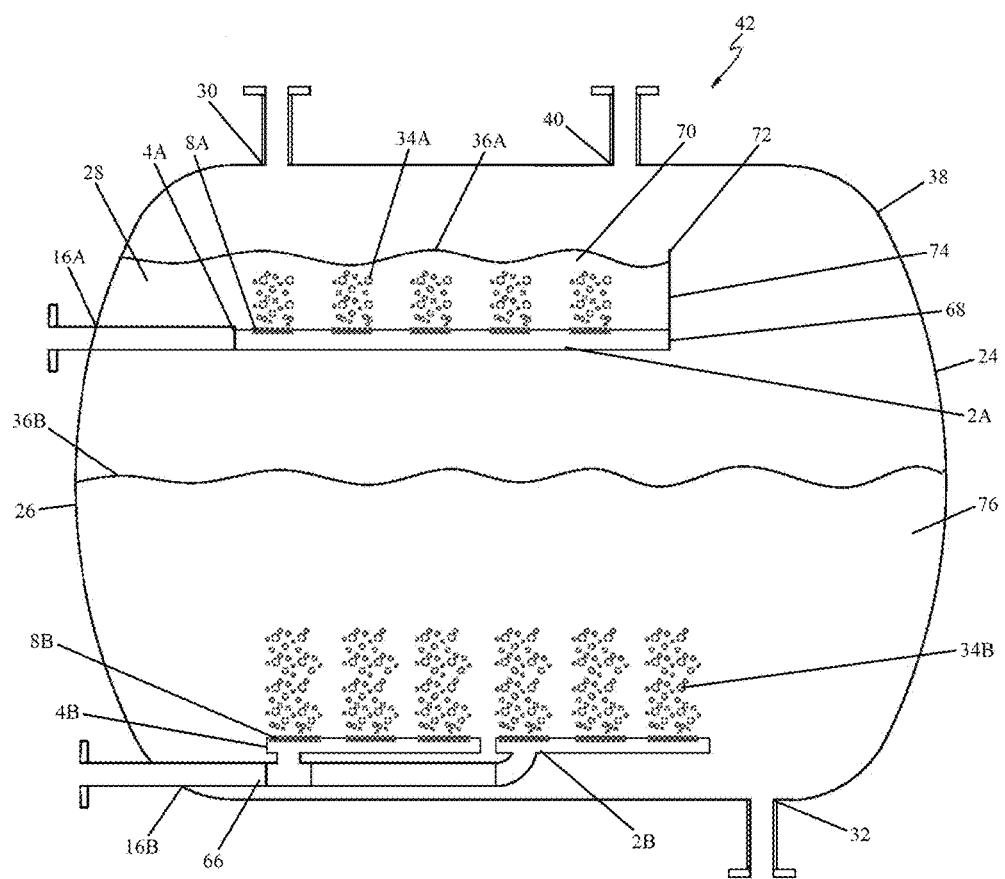
FIG. 9 is a side sectional view of an embodiment of a process apparatus of the present invention.

Referring now to FIG. 9, another embodiment of a degassing system 42 comprises a process vessel 24, an upper degassing device 2A, and a lower degassing device 2B. In the embodiment of FIG. 9, a process liquid 28 is introduce to process vessel 24 via a process liquid inlet 30. Process liquid 28 entering process vessel 24 flows downward toward a tray 68 which extends horizontally within an upper portion 38 of process vessel 24. A top layer 70 of process liquid 28 is formed on tray 68. When the top layer 70 process liquid 28 top layer surface 36A reaches the upper end 72 of a weir 74, process liquid 28 overflows into a lower portion 26 of process vessel 24, forming a bottom layer 76 of process liquid 28. Flow of process liquid 28 out of process vessel 24, via process liquid outlet 32, is controlled so that a level of bottom layer 76 process liquid 28 having a bottom layer surface 36B is maintained. As would be understood by one skilled in the art, such a level of bottom layer 76 process liquid 28 may be maintained by a variety of means, such as, but not limited to, valving and/or gravitational level control.

Also shown in the embodiment of FIG. 9 is upper degassing device 2A, which rests upon or is integral with tray 68. In one embodiment, upper degassing device 2A comprises a plurality of non-contiguous sintered metal matrices 8A along an upper section 4A thereof, although other configurations, orientations, and/or arrangements, as described herein, may be employed. In one embodiment, pressurized gas (not shown) is provided to upper degassing device 2A via a gas inlet 16A, which results in formation of gas bubbles within the sintered metal matrices 8A, whereby the gas bubbles 34A rise through the top layer 70 of process liquid 28, penetrate the top layer surface 36A, and form a gaseous composition (not shown) above top layer surface 36A. In one embodiment, the gaseous composition departs process vessel 24 via gas outlet 40.

Further shown in the embodiment of FIG. 9 is lower degassing device 2B, which is disposed in a lower portion 26 of process vessel 24. In one embodiment, lower degassing device 2B comprises a plurality of non-contiguous sintered metal matrices 8B along an upper section 4B of degassing device 2B comprising a gas manifold 66, although other configurations, orientations, and/or arrangements, as described herein, may be employed. In one embodiment, pressurized gas (not shown) is provided to lower degassing device 2B via a gas inlet 16B, which results in formation of gas bubbles within the sintered metal matrices 8B, whereby the gas bubbles 34B rise through the bottom layer 76 of process liquid 28, penetrate the bottom layer surface 36B, and form a gaseous composition (not shown) above bottom layer surface 36B. In one embodiment, the gaseous composition departs process vessel 24 via gas outlet 40. In one aspect, utilization of a plurality of process liquid 28 levels (such as the two levels depicted in FIG. 9), each level employing one or more degassing devices 2, effectuates process liquid 28 to undergoing more than one degassing action.

Figure 10:
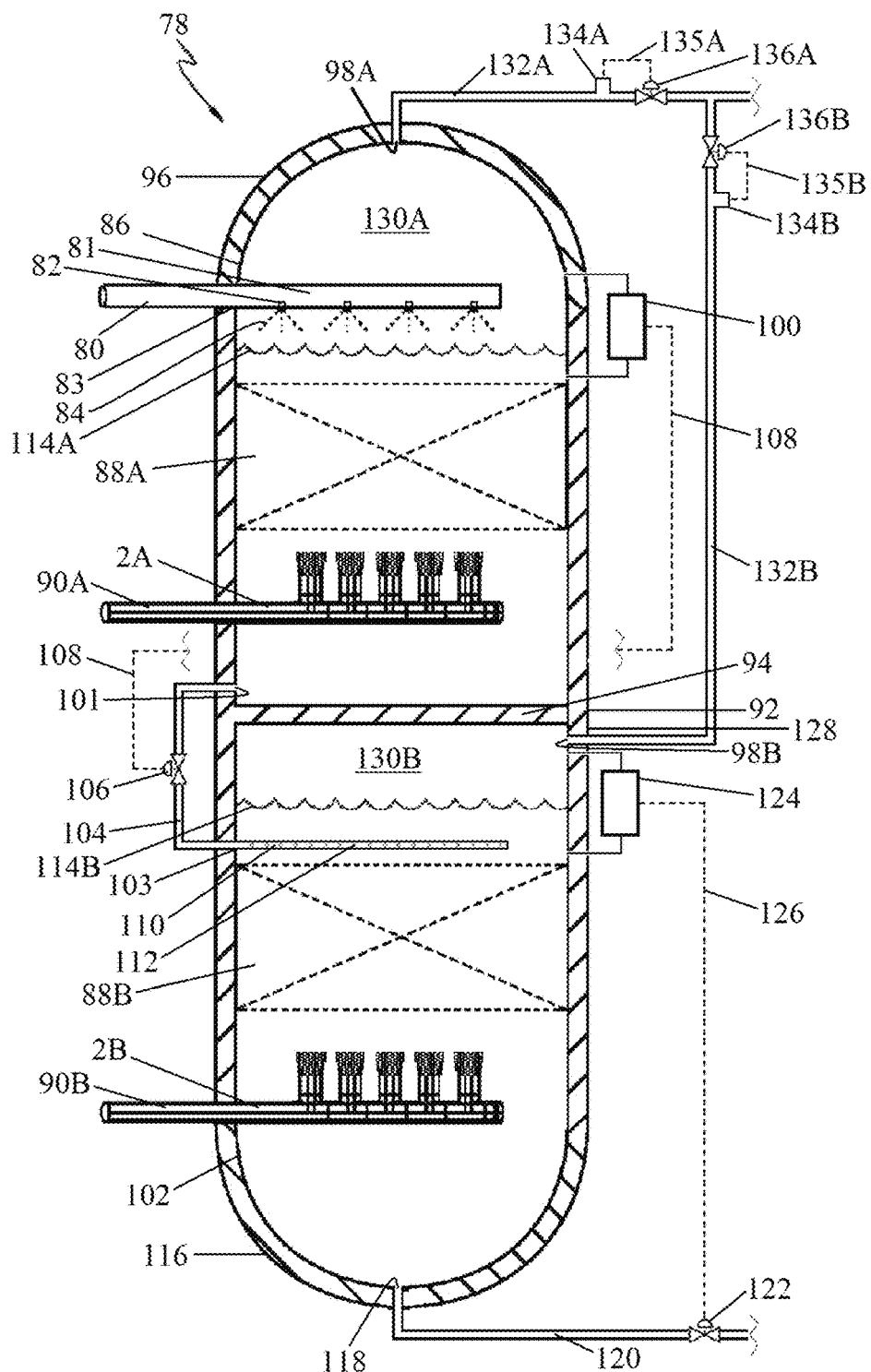
FIG. 10 is a side sectional view of an embodiment of a degassing tower of the present invention.

In FIG. 10 is depicted an embodiment of a degassing tower (column) 78. In one aspect, degassing tower 78 comprises a standard industrial vessel, which may be single-walled or double-walled, insulated, and/or jacketed, as would be understood by one skilled in the art. In the embodiment shown in FIG. 10, degassing tower 78 comprises a liquid inlet line 80 through which a process liquid, such as, but not limited to, molten sulfur is provided to degassing tower 78 via an upper liquid entry opening (inlet) 83. In one embodiment, liquid inlet line 80 is in fluid communication with, or is integral to, a liquid dispersion component 81. In one embodiment, liquid dispersion component 81 is a substantially tubular component comprising one or more nozzles 82 there along through which process liquid 84 is introduced into a first degassing tower chamber 86. In other embodiments (not shown), process liquid 84 may be introduced into first degassing tower chamber 86 by means and/or devices not comprising nozzles.

In one embodiment, provided within a first degassing tower chamber 86 is a packed bed section 88A. In one embodiment, packed bed section 88A may comprise a randomly filled packing material, such as, but not limited to, Raschig rings, or may comprise a structured packing material, as would be understood by one skilled in the art. In one embodiment, additionally provided within a first degassing tower chamber 86 is a degassing device 2A that is fluidly connected to a gas inlet line 90A. Although the degassing device 2A (and 2B discussed below) depicted in FIG. 10 is substantially similar to the degassing device 2 shown in and described regarding FIG. 6, the invention is not so limited and other embodiments of a degassing device 2A (or 2B) may be employed in a degassing tower 78.

In one embodiment, first degassing tower chamber 86 is bounded at a bottom end 92 thereof by a first tower chamber plate 94. In one embodiment, an upper level indicator controller (LIC) 100 is provided in informational communication with first degassing tower chamber 86. In one aspect, upper level indicator controller (LIC) 100 is adapted and configured to ascertain the level 114A of process liquid 84 within first degassing tower chamber 86.

In the embodiment shown in FIG. 10, degassing tower 78 comprises a second degassing tower chamber 102. In one embodiment, second degassing tower chamber 102 comprises a packed bed section 88B, similar to packed bed section 88A described above. In one embodiment, additionally provided within second degassing tower chamber 102 is a degassing device 2B that is fluidly connected to a gas inlet line 90B. In the embodiment of degassing tower 78 shown in FIG. 10, second degassing tower chamber 102 is depicted as be positioned directly beneath first degassing tower chamber 86, however, the invention is not so limited and other orientations may be employed.

In the degassing tower 78 embodiment depicted in FIG. 10, first degassing tower chamber 86 is fluidly connected to second degassing tower chamber 102 via a transfer piping segment 104. In one embodiment, first degassing tower chamber 86 is in fluid communication with transfer piping segment 104 via a liquid exit opening (outlet) 101, and second degassing tower chamber 102 is in fluid communication with piping segment transfer 104 via a lower liquid entry opening (inlet) 103. In one embodiment, transfer piping segment 104 is in fluid communication with, or is integral to, a liquid distribution component 110 disposed within second degassing tower chamber 102. In one embodiment, liquid distribution component 110 is a substantially tubular component comprising one or more orifices 112 there along through which process liquid 84 is introduced into second degassing tower chamber 102.

In one embodiment, an upper level control valve component 106 is provided in transfer piping segment 104. Upper level control valve component 106 may be in informational communication with upper LIC 100, as indicated by dotted line 108. In one aspect, upper level control valve component 106, in conjunction with upper LIC 100, may be utilized to control a level 114A of process liquid 84 within first degassing tower chamber 86.

In one embodiment, disposed proximate a bottom end 116 of second degassing tower chamber 102 is one or more liquid exit openings (outlets) 118, through which process liquid 84 may exit second degassing tower chamber 102. In one embodiment, a liquid outlet 118 is in fluid communication with an exit piping segment 120. In one embodiment, a lower level control valve component 122 is provided in exit piping segment 120. In one embodiment, a lower level indicator controller (LIC) 124 is provided in informational communication with second degassing tower chamber 102. In one aspect, lower level indicator controller (LIC) 124 is adapted and configured to ascertain the level 114B of process liquid 84 within second degassing tower chamber 102. Lower level control valve component 122 may be in informational communication with lower LIC 124, as indicated by dotted line 126. In one aspect, lower level control valve component 122, in conjunction with lower LIC 124, may be utilized to control a level 114B of process liquid 84 within second degassing tower chamber 102.

In one embodiment, disposed proximate a top end 96 of first degassing tower chamber 86 is one or more gas venting outlets 98A, through which gas (not shown) may exit first degassing tower chamber 86. In one embodiment, disposed proximate a top end 128 of second degassing tower chamber 102 is one or more gas venting outlets 98B, through which gas (not shown) may exit second degassing tower chamber 86. In one embodiment, gas (not shown) within an upper vapor space 130A of first degassing tower chamber 86 is vented therefrom into upper vent piping segment 132A via gas vent outlet 98A, and gas (not shown) within an upper vapor space 130B of second degassing tower chamber 102 is vented therefrom into lower vent piping segment 132B via gas vent outlet 98B. In one embodiment, upper vent piping segment 132A comprises an upper pressure measurement device 134A and/or lower vent piping segment 132B comprises a lower pressure measurement device 134B. In one embodiment, upper vent piping segment 132A comprises an upper vent control valve component 136A and/or lower vent piping segment 132B comprises a lower vent control valve component 136B. In one aspect, upper pressure measurement device 134A, in conjunction with upper vent control valve component 136A (collectively pressure indicator controller (PIC) 135A), may be utilized to control gas flow from, and/or pressure within, upper vapor space 130A. In one aspect, lower pressure measurement device 134B, in conjunction with lower vent control valve component 136B (collectively pressure indicator controller (PIC) 135B), may be utilized to control gas flow from, and/or pressure within, lower vapor space 130B.

Although the embodiment of degassing tower 78 depicted in FIG. 10 comprises two tower chambers, the invention is not so limited and a degassing tower 78 may comprise a single tower chamber, or three or more tower chambers, as would be understood by one skilled in the art.

In other embodiments of the present invention (not shown), a degassing device 2 may be employed to degas liquids occupying non-vessel environments, such as, but not limited to, pits, trenches, reservoirs, canals, and wells. In such a body of liquid, one or more degassing devices 2, fluidly connected to a pressurized gas source, may be positioned beneath the surface of a liquid to be degassed, wherein introduction of the pressurized gas to the degassing device(s) 2 generates bubbles, as described above, which results in a gaseous composition forming above the surface of the liquid. In one aspect, such formed gaseous composition may be contained, destroyed, or otherwise taken care of, as would be understood by one skilled in the art.

Operation

Generally, a degassing operation employing one or more embodiments of a degassing component of the present invention comprises providing a process liquid to be degassed, and positioning at least one degassing component at least partially beneath a surface of the process liquid. A pressurized gas is introduced to one or more of the degassing components, wherein flow of the pressurized gas though the sintered metal matrix/matrices produces gas bubbles within the process liquid. The gas bubbles rise though the process liquid toward the surface thereof, which results in the gas and other volatile compounds contained in the process liquid, such as, but not limited to, hydrogen sulfide and hydrogen polysulfide compounds, penetrating the surface of the process liquid to form a gaseous composition there above. The gaseous composition, comprising the gas and any other volatile components purged from the process liquid, is removed or otherwise taken care of, and the purified process liquid is removed or otherwise recovered. In one aspect, the formed gaseous composition can be exposed to a process or device which at least partially removes non-gaseous components therefrom, which non-gaseous components may be returned to the process liquid or otherwise taken care of.

In one embodiment, a degassing operation comprises utilizing a degassing system 42 containing a process vessel 24 equipped with a degassing device 2, as depicted in FIG. 3. In one embodiment, a process liquid 28 is flowed into the process vessel 24 via process liquid inlet 30. In one embodiment, pressurized gas (not shown) is introduced to degassing device 2 via gas inlet 16, wherein the pressurized gas is provided in the interior 12 of lower section 6, and wherein the gas flows though the sintered metal matrix 8 to produces gas bubbles 34 (not shown in FIG. 3) which are forced by gas pressure into the process liquid 28. The gas bubbles 34 rise though the process liquid 28 toward the surface 36 thereof, which results in the gas and other volatile compounds contained in the process liquid 28, such as, but not limited to, hydrogen sulfide and hydrogen polysulfide compounds, penetrating the surface 36 of the process liquid 28 to form a gaseous composition (not shown) there above within the upper portion 38 of process vessel 24. The gaseous composition, comprising the gas and any other volatile components purged from the process liquid, is allowed to flow out of the process vessel 24 via gas outlet 40, and the purified process liquid 28 is allowed to flow out of the process vessel 24 via process liquid outlet 32. In the embodiment depicted in FIG. 3, the formed gaseous composition passes through a demister 54, which at least partially "knocks down" non-gaseous components back into to the process liquid 28, before exiting process vessel 24.

In an embodiment of a degassing operation utilizing an embodiment of a degassing tower 78 of the present invention, a process liquid (for example only, a molten sulfur stream) 84 is provided to degassing tower 78 via liquid inlet line 80. As would be understood by one skilled in the art, sulfur is maintained in a molten state at or above a certain temperature. For details of an example of a sulfur degassing process, reference is made to herein incorporated U.S. Pat. No. 5,632,967 to Nasato.

In one embodiment, the molten sulfur is pumped (or otherwise pressurized above atmospheric pressure) into liquid inlet line 80. The molten sulfur 84 is flowed through liquid dispersion component 81 and into first tower chamber 86 via nozzle(s) 82. In one embodiment, a molten sulfur level 114A is provided in first tower chamber 86 and a molten sulfur level 114B is provided in second tower chamber 102, via operation of upper LIC 100, upper level control valve component 106, and lower LIC 124, as would be understood by one skilled in the art.

In one embodiment, a pressurized gas (not shown) is provided to first tower chamber 86 through upper liquid inlet 83 via gas inlet line 90A, and a pressurized gas (not shown) is provided to second tower chamber 102 via gas inlet line 90B. In one embodiment, the pressurized gas comprises oxygen, although the invention is not so limited and gasses not comprising oxygen may be employed, as described above.

With regard to first tower chamber 86, the pressurize gas is flowed through degassing device 2A, whereby, microbubbles of the gas (not shown in FIG. 10) rise through the molten sulfur 84. In one aspect, the molten sulfur 84 and the micro-bubbles are contacted within packed bed section 88A. In one embodiment, the micro-bubbles rise above molten sulfur level 114A into upper vapor space 130A, and flow out of first tower chamber 86 through vent piping segment 132A via gas venting outlet 98A.

In one embodiment, molten sulfur 84 which has been subjected to degassing in first tower chamber 86 flows into transfer piping segment 104 via liquid outlet 101, and flows from transfer piping segment 104 into second tower chamber 102 via lower liquid inlet 103. As described above, upper level control valve component 106 is utilized to control the flow of molten sulfur 84 from first tower chamber 86 into second tower chamber 102.

With regard to second tower chamber 102, the pressurize gas is flowed through degassing device 2B, whereby, microbubbles of the gas (not shown in FIG. 10) rise through the molten sulfur 84. In one aspect, the molten sulfur 84 and the micro-bubbles are contacted within packed bed section 88B. In one embodiment, the micro-bubbles rise above molten sulfur level 114B into lower vapor space 130B, and flow out of second tower chamber 102B through vent piping segment 132B via gas venting outlet 98B.

In one embodiment, vapor flow through vent piping segment 132A, and therefore pressure within upper vapor space 130A, is maintained as desired utilizing PIC 135A. In one embodiment, vapor flow through vent piping segment 132B, and therefore pressure within upper vapor space 130B, is maintained as desired utilizing PIC 135B. In one embodiment, degassed molten sulfur 84 flows out of second tower chamber 102 through exit piping segment 120 via liquid outlet 118.

In one embodiment, operation of degassing tower 78 results in reduction of hydrogen sulfide compounds in a molten sulfur 84 below about five (5) ppm by weight. In one embodiment, operation of degassing tower 78 results in reduction of hydrogen sulfide compounds in a molten sulfur 84 below about two (2) ppm by weight. Not to be bound by theory, it is believed that the employment of degassing devices 2A, 2B, in conjunction with packed bed sections 88A, 88B, respectively, effectuates an enhanced degassing efficiency.

A degassing operation utilizing an embodiment of a degassing component of the present invention may be carried out in a continuous, semi-continuous, of batch-wise manner, as would be understood by one skilled in the art.

Method

An exemplary method of degassing a process liquid utilizing an embodiment of a degassing device of the present invention comprises:

A Process Liquid Provision Step, comprising providing a process liquid containing volatile impurities, such as process liquid 28, continuously or batch-wise, to a process vessel, such as a process vessel 24;

A Degassing Device Provision Step, comprising providing a degassing device, such as degassing device 2, at least partially beneath the upper surface, such as upper surface 36, of the process liquid, wherein the degassing device is fluidly connected to a pressurized gas source; and A Degassing Step, comprising introducing pressurized gas to the degassing device, whereby gas is forced through a sintered metal matrix, such as sintered metal matrix 8, of the degassing device, whereby gas micro-bubbles, such as gas bubbles 34, are produced within the sintered metal matrix, and the gas bubbles are pressured into the process liquid, rise through the process liquid to the upper surface of the process liquid, and penetrate the upper surface to form a gaseous composition above the upper surface, wherein the gaseous composition comprises at least a portion of any volatile impurities that were present in the process liquid.

The foregoing method is merely exemplary, and additional embodiments of a method of utilizing a degassing device of the present invention consistent with the teachings herein may be employed. In addition, in other embodiments, one or more of these steps may be performed concurrently, combined, repeated, re-ordered, or deleted, and/or additional steps may be added.

An exemplary method of degassing a process liquid utilizing an embodiment of a degassing tower of the present invention comprises:

A Degassing Tower Provision Step, comprising providing a degassing tower, such as a degassing tower 78, wherein the degassing tower comprises a first tower chamber, such as first tower chamber 86, and a second tower chamber, such as second tower chamber 102;

A Process Liquid Provision Step, comprising providing a process liquid containing volatile impurities, such as process liquid 84, to the first tower chamber of the degassing tower, wherein a process liquid level, such as a level 114A, is maintained in the first tower chamber, and a process liquid level, such as a level 114B, is maintained in the second tower chamber;

A Degassing Step, comprising introducing pressurized gas to a degassing device, such as a degassing device 2A, provided within the first tower chamber 86, and introducing pressurized gas to a degassing device, such as a degassing device 2B, provided within the second tower chamber 102, whereby gas micro-bubbles, such as gas bubbles 34, are produced within the sintered metal matrices, and the gas bubbles are pressured into the process liquid, rise through the process liquid to the upper surfaces of the process liquid, and penetrate the upper surfaces to form gaseous compositions above the upper surfaces, wherein the gaseous compositions comprise at least a portion of any volatile impurities that were present in the process liquid and exit the degassing tower.

The foregoing method is merely exemplary, and additional embodiments of a method of utilizing a degassing tower of the present invention consistent with the teachings herein may be employed. In addition, in other embodiments, one or more of these steps may be performed concurrently, combined, repeated, re-ordered, or deleted, and/or additional steps may be added.

The foregoing description of the invention illustrates exemplary embodiments thereof. Various changes may be made in the details of the illustrated construction and process within the scope of the appended claims by one skilled in the art without departing from the teachings of the invention. Disclosure of existing patents, publications, and/or known art incorporated herein by reference is to the extent required to provide details and understanding of the disclosure herein set forth. The present invention should only be limited by the claims and their equivalents.

I claim:

1. A degassing tower comprising:
a first degassing tower chamber; and
a second degassing tower chamber;
wherein:
said first degassing tower chamber comprises a liquid inlet, a liquid outlet, a gas inlet, and a gas outlet;
disposed within said first degassing tower chamber is a packed bed section and a first degassing device;
said second degassing tower chamber comprises a liquid inlet, a liquid outlet, a gas inlet, and a gas outlet;
disposed within said second degassing tower chamber is a packed bed section and a second degassing device;
each said degassing device comprises at least one sintered metal matrix;
each said degassing device is disposable at least partially beneath a surface of a liquid;
provision of gas to each said degassing device produces gas bubbles within at least one said sintered metal matrix thereof; and
said gas bubbles have a median diameter at least as small as about ten micrometers;
wherein:
said first degassing device is fluidly connected to said first degassing tower chamber gas inlet;
said second degassing device is fluidly connected to said second degassing tower chamber gas inlet;
liquid can flow from said first degassing tower chamber to said second degassing tower chamber; and
liquid cannot flow from said second degassing tower chamber to said first degassing tower chamber.

2. The degassing tower of claim 1, wherein said gas provided to at least one said degassing device is substantially devoid of liquid.

3. The degassing tower of claim 1, wherein said first degassing tower chamber liquid inlet is connected to, or integral with, a liquid dispersion component and/or said second degassing tower chamber liquid inlet is connected to, or integral with, a liquid distribution component.

4. The degassing tower of claim 1, wherein no gas exiting said first degassing tower chamber and/or said second degassing tower chamber is recycled through the degassing chamber from which it exited.

5. The degassing tower of claim 1, comprising a first level control device that controls a liquid level in said first degassing tower chamber and a separate, second level control device that controls a liquid level in said second degassing tower chamber.

6. The degassing tower of claim 1, wherein said first degassing tower chamber liquid outlet is fluidly connected to said second degassing tower chamber liquid inlet.

7. The degassing tower of claim 1, wherein said first degassing tower chamber gas outlet is separate from said second degassing tower chamber gas outlet.

8. The degassing tower of claim 1, wherein at least one said packed bed section within said first degassing tower chamber and said packed bed section within said second degassing tower chamber comprises structured packing material.

9. The degassing tower of claim 1, wherein said first degassing tower chamber is positioned substantially above said second degassing tower chamber.

10. The degassing tower of claim 1, wherein at least a portion of at least one said sintered metal matrix comprises metal powder disposed there within.

11. The degassing tower of claim 10, wherein said metal powder comprises stainless steel.

12. A method of degassing a liquid, comprising:
providing the degassing tower of claim 1;
introducing said liquid to said first degassing tower chamber via said first degassing tower chamber liquid inlet;
establishing a level of said liquid in said first degassing tower chamber and said second degassing tower chamber, wherein said liquid flows out of said first tower chamber via said first tower chamber liquid outlet and flows into said second tower chamber via said second tower chamber liquid inlet; and introducing a pressurized gas to said first degassing device via said first degassing tower chamber gas inlet and introducing a pressurized gas to said second degassing device via said second degassing tower chamber gas inlet, whereby at least a portion of said gas provided to each said degassing device is forced through at least a portion of at least one said sintered metal matrix, whereby gas bubbles having a diameter of at least as small as about ten micrometers are produced within said sintered metal matrices.

13. The method of claim 12, wherein said gas bubbles have a median diameter of about one to about two micrometers.

14. The method of claim 12, wherein said liquid comprises molten sulfur.

* * * * *